United States Patent [19]
Moller

[11] 3,811,810
[45] May 21, 1974

[54] DEEP-DRAWING MOULD FOR SHAPING THERMOPLASTIC PANELS

[76] Inventor: Hans Günter Möller, Oldinburger Landstr. 50, 287 Delmenhorst, Germany

[22] Filed: Mar. 5, 1973

[21] Appl. No.: 337,993

Related U.S. Application Data
[63] Continuation of Ser. No. 94,714, Dec. 3, 1970, abandoned.

[52] U.S. Cl. .............................. 425/185, 425/388
[51] Int. Cl. ............................................. B29c 17/02
[58] Field of Search ........... 425/383, 384, 387, 388, 425/404, 187, 185

[56] References Cited
UNITED STATES PATENTS

| | | | |
|---|---|---|---|
| 3,540,113 | 11/1970 | Krutzikowsky | 425/388 X |
| 2,985,914 | 5/1961 | Miller | 425/388 |
| 3,307,222 | 3/1967 | Baldwin et al. | 425/388 X |
| 3,496,607 | 2/1970 | Larson | 425/388 X |
| 3,121,920 | 2/1964 | Doyle et al. | 425/388 |
| 3,358,061 | 12/1967 | Gidge et al. | 425/404 X |
| 2,351,885 | 6/1944 | Sommerfeld | 425/DIG. 57 |
| 2,910,728 | 11/1959 | Rowe | 425/388 |
| 3,041,669 | 7/1962 | Marshall et al. | 425/388 X |
| 3,107,396 | 10/1963 | Fowler et al. | 425/388 X |
| 3,179,980 | 4/1965 | Ryan et al. | 425/388 |
| 3,156,012 | 11/1964 | Hritz | 425/388 |

Primary Examiner—J. Howard Flint, Jr.
Attorney, Agent, or Firm—Sughrue, Rothwell, Mion, Zinn & Macpeak

[57] ABSTRACT

A deep-drawing mould for shaping bathroom forms from the thermoplastic panels. The mould comprises a rigid, box-shaped master having a steel outer wall and a spaced, aluminum inner wall. The inner wall is ported in the corners so that a vacuum may be drawn to pull an overlying thermoplastic panel down into the mould, and temperature regulating means are also provided between the walls. Detachable mould parts, such as a wash basin form, may be inserted in the master mould and provided with separate vacuum drawing means.

7 Claims, 4 Drawing Figures

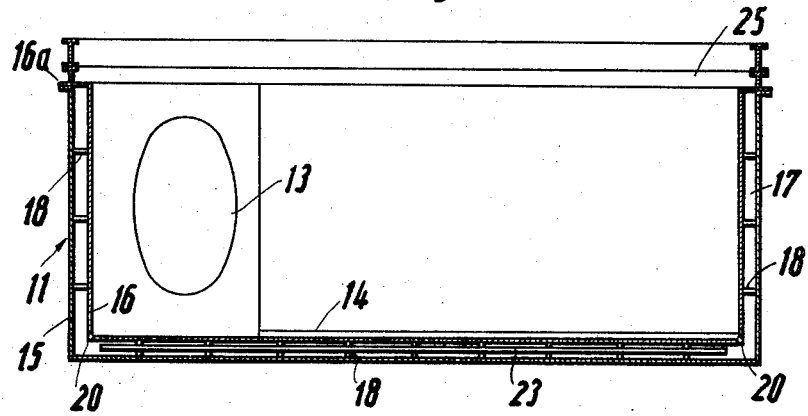
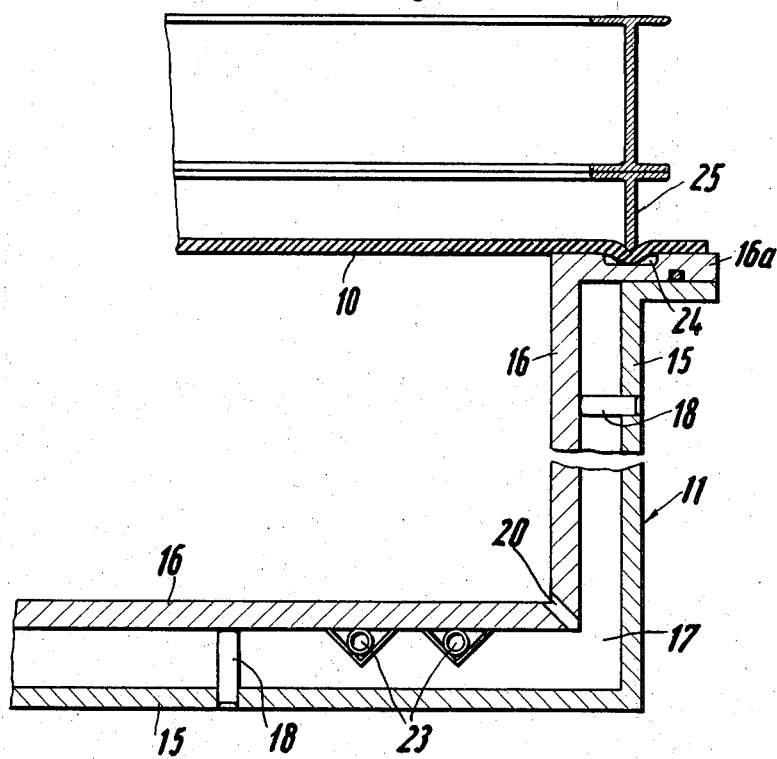

DEEP-DRAWING MOULD FOR SHAPING THERMOPLASTIC PANELS

This is a continuation, of U.S. Pat. application Ser. No. 94,714, filed Dec. 3, 1970 now abandoned.

This invention relates to a deep-drawing mould for shaping thermoplastic panels, in particular for the production of large-volume mouldings, for example parts (halves) of a room with integrally shaped sanitary apparatus, such as bath tub, shower basin, wash basin, WC pan and the like.

The production of extremely large mouldings such as room parts, in particular room halves, by the deep-drawing of a thermoplastic panel such as an acrylic glass panel, the most diverse sanitary parts or the like being integrally moulded therewith depending on the application, poses particularly stringent requirements on the construction of moulds. The production of the most diverse kinds and differently constructed rooms with sanitary apparatus presupposes that suitably different deep-drawing moulds with the appropriate programme are available so that a suitable deep-drawing mould is to hand for any requirement. This in turn means that the proportion of mould cost in the overall production costs is very substantial if the programme varies comprehensively, with the result that the production of such large-volume moulds is rendered substantially more expensive.

According to the present invention there is provided a deep-drawing mould for shaping thermoplastic panels, in particular for the production of large-volume mouldings, for example parts (halves) of a room with integrally shaped sanitary apparatus, such as bath tub, shower basin, wash basin, WC pan and the like, in which mould a plurality of detachably inserted mould parts corresponding to the sanitary apparatus or the like to be incorporated into the moulding is provided in a rigid box-shaped master mould having a high degree of form stability.

The invention enables the provision of a deep-drawing mould of simple construction which enables different kinds of mouldings to be produced without excessive cost.

The detachable mould parts may be exchanged according to requirements and replaced wholly or partially with other mould parts in the master mould depending on the desired content of the mouldings to be produced. For example, by means of the invention it is possible to produce two room halves with differently formed sanitary apparatus in one and the same deep-drawing mould, namely by exchange of the appropriate mould parts. It is then necessary merely to provide a master mould and a number of different insertable mould parts corresponding to the entire programme.

According to a preferred feature of the invention, the master mould is constructed as double-walled box with a strong external wall, for example of steel and an internal wall, fixed at a distance relative to the external wall to define a cavity and constructed, for example of a material having a good thermal conductivity such as aluminium. Such a deep-drawing mould also offers various advantages. A high degree of form stability is obtained in a simple manner and with relatively slight wall thicknesses by virtue of the double-walled construction of the master mould. Furthermore, the cavity formed between the two walls is particularly suited for application of the vacuum required for deep drawing.

In order that the invention may be clearly understood, an embodiment thereof will now be described in more detail, by way of example only, with reference to the accompanying drawings in which:

FIG. 3 is a section on the line III—III of FIG. 1;

FIG. 4 is a sectional view on an enlarged scale of the upper and lower corner construction of the deep-drawing mould.

Figure 1:
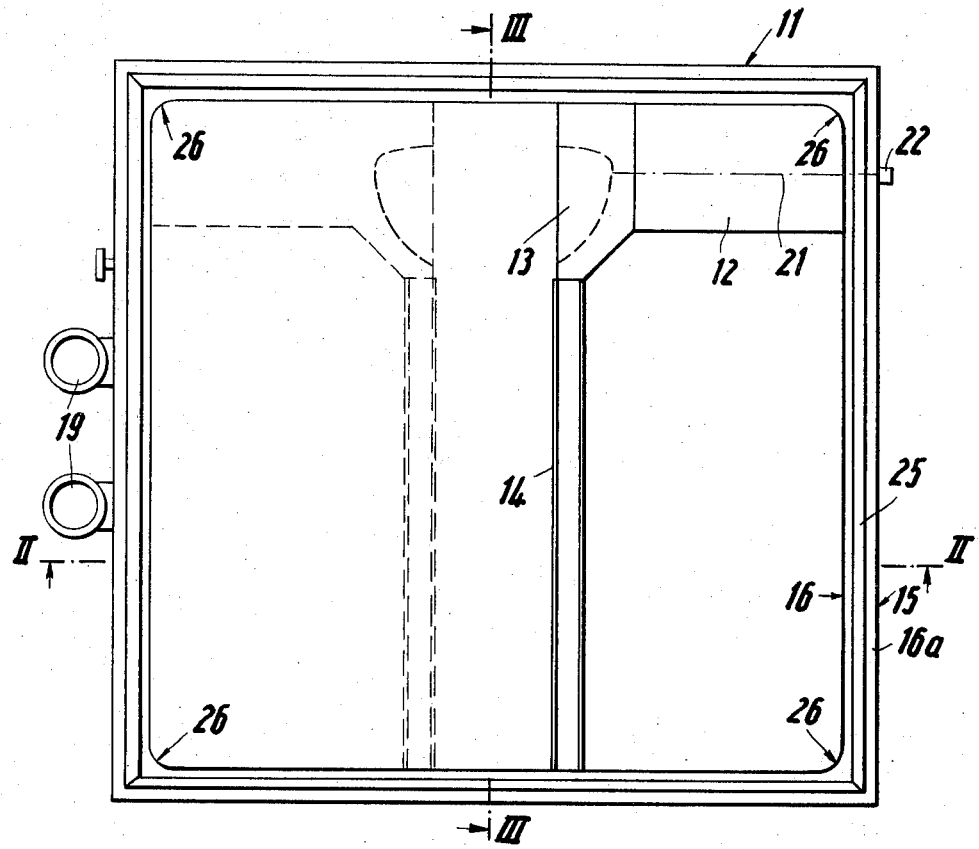
FIG. 1 is a plan view of a deep-drawing mould embodying the invention.

The drawings illustrate the application of the invention to the production of deep-drawn mouldings each corresponding to one half of a room provided with sanitary apparatus, namely of a bathroom, shower room or the like. Accordingly, the mouldings are provided with integrally moulded sanitary apparatus such as a bath tub, shower basin, wash basin, WC pan and the like. One of said room halves is produced in one deep-drawing cycle from a panel 10 of thermoplastic material, for example acrylic glass.

According to the invention, a deep-drawing mould for producing mouldings of the kind described comprises a box-shaped master mould 11, open at the top, and mould parts 12, 13 and 14 which are insertable therein depending on requirements. In the illustrated embodiment, the mould part 12 forms a base below a mould part 13 forming a wash basin. The numeral 14 refers to a strip 4 adapted to be positioned on the floor of the master mould 11 to form a raised portion in the finished moulding to project inwardly into the room and therefore representing a stiffening of the thermoplastic wall.

The mould parts 12, 13 and 14 fall into two distinct groups, namely fixed mould parts which remain in the master mould 11 for the next deep-drawing cycle when the deep-drawn moulding is removed and loose mould parts which, by virtue of the construction of the drawn parts of the moulding are withdrawn therewith from the master mould and are removed therefrom for re-use only after cooling of the moulding. The loose mould parts are those which serve to form the recesses of the moulding. In the illustrated embodiment the mould part 13 forming the wash basin is constructed as a loose mould part.

Figure 2:
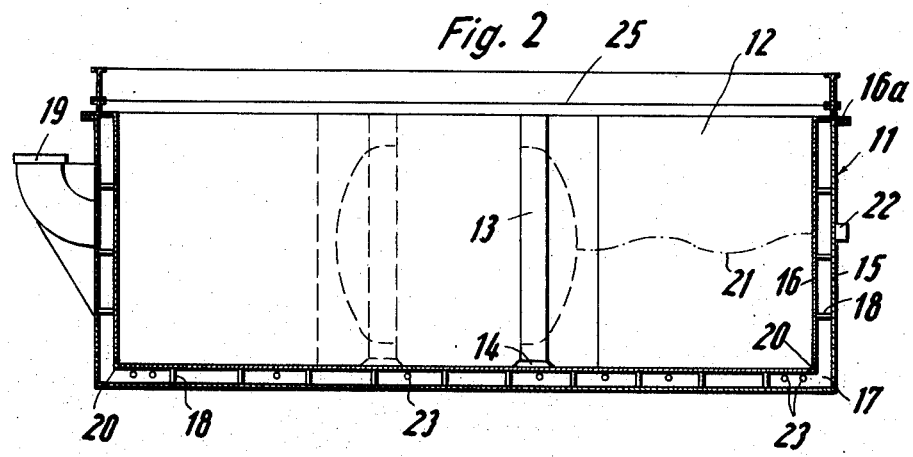
FIG. 2 is a section on the line II—II of FIG. 1.

The interchangeability of the mould parts 12, 13 and 14 enables different mouldings to be deep-drawn in one and the same master mould 11. It is furthermore possible for the mould parts 12, 13 and 14 to be disposed on one of the other side of the master mould as indicated by broken lines in FIGS. 1 and 2. It is thus possible for rooms to be produced in which the individual sanitary parts are disposed in a mirror image pattern, a feature which is frequently required because of the local conditions in building structures.

The master mould 11 is constructed in a particular manner. It comprises a stable external wall 15, for example of steel, where appropriate provided with stiffening ribs on the exterior and an internal wall 16, particularly of a material having a good thermal conductivity, for example aluminium. The external wall 15 and the internal wall 16 are spaced apart to form a cavity 17 therebetween. The cavity between the external wall 15 and the internal wall 16 is maintained by a plurality of distributed bolt-shaped spacers secured on the external wall 15 and having free ends on which the internal wall 16 is adapted to bear.

The cavity 17 serves to distribute and transmit the necessary vacuum for the drawing operation uniformly to the plasticised plastics panel 10 with the result that the said panel 10 is drawn relatively rapidly into all corners and indentations during the deep-drawing operation. To this end, the entire cavity 17, sealed relative to the exterior, is evacuated through a suction line 19. The suction is transferred from the cavity 17 through suction ports 20 into the interior of the master mould 11 where it acts on the plasticised panel 10. Preferably, a substantial number of the suction ports 20 are disposed at the lower right-angled fillets of the internal wall 16.

As far as necessary, the insertable mould parts 12, 13 and 14 are provided with suction ports in order to ensure uniform and adequate distribution of the vacuum in the master mould 11. Moreover, the mould parts 12, 13 and 14 are so constructed that joints and gaps remain between adjacently disposed mould parts where appropriate to enable the vacuum to reach the required positions. For particularly difficult zones of the mould; for example in the zone of a wash basin, it is possible for the appropriate mould part 13 to be separately and additionally connected to a vacuum line 21 which is brought through the mould part 12 and has its own vacuum connection 22. By applying suction through such vacuum duct 21 after the main deep-drawing operation, it is possible for the wash basin or similar moulding to be particularly precisely shaped by a final drawing process.

The cavity 17 also incorporates a heating system 23, for example a tube nest heating system, to ensure that a uniform temperature is maintained at the internal wall 16 and the interior of the master mould 11. The temperature of the master mould and therefore also of the mould parts 12, 13 and 14 can thus be particularly precisely controlled. Where necessary, it is possible for cold air to be supplied through the cavity 17 if the temperature of the mould is too high after a plurality of deep-drawing cycles have been performed. Furthermore, the cavity 17 also provides for good thermal insulation.

The upper edge of the master mould 11 is formed by a flange 16a of the internal wall 16. A circumferentially extending sealing groove 24 is disposed on said flange and the thermoplastic panel 10 may be fixed thereon during deep-drawing by a panel holder 25 of frame construction adapted to be lowered on to said flange 16a.

In the deep-drawing mould embodying the invention, it is possible for the corners and edges generally to be formed without radiusing or precise machining since the panel 10 is not drawn sharply into said corners and edges during the deep-drawing operation but has natural radiuses which are desired for the purpose of application. Radiused portions 26 are provided merely at the upper edge of the mould at the four corners so that the panel 10 bears precisely in this zone to ensure precise shaping of the radius. This is necessary in the upper edge zone of the moulding because the other room half, produced in a separate deep-drawing operation, must adjoin with a precise fit on to the radiuses of the moulding to prevent the formation of any steps or edges on assembly.

The mould parts 12, 13 and 14 may be constructed of aluminium, some other metal or, in appropriate cases, of wood or plastics.

What we claim is:

1. An adaptive deep drawing mold assembly for the vacuum shaping and forming of large volume, three dimensional, hollow thermoplastic unitary structures from large area, substantially planar, deformable thermoplastic panels, such structures including boundary panels and inwardly projecting, interior fixtures integral with the boundary panels, said assembly comprising:
   a. an open topped, large volume, rigid box-shaped master mold having spaced inner and outer walls sealingly engaged with each other at the upper edge of the mold defining the open top,
   b. means for sealing a thermoplastic panel placed over the open top of the mold to the upper edge thereof,
   c. perforations in the inner wall to permit communication between the interior volume of the box-shaped master mold and the space between the inner and outer walls,
   d. a plurality of relatively small volume, separable mold parts dimensioned to be simultaneously, cooperably, and loosely inserted within the master mold in a plurality of predetermined, inwardly projecting, selective configurations to provide a mold assembly whose over all configuration is defined by the general box-shape of the master mold as modified by the inward projection formed by the separable mold parts, the inner wall of the master mold defining the boundary panels, and the separable mold parts defining the interior fixtures, and
   e. means coupled through the outer wall to the space between the inner and outer walls for evacuating air therefrom, whereby a deformable thermoplastic panel placed over the open top of the mold and sealed to the upper edge thereof may be vacuum drawn down into the mold against the inner wall and the separable mold parts to form a structure conforming to said overall configuration.

2. A mold assembly as defined in claim 1 further comprising heat producing means mounted between the inner and outer walls of the master mold.

3. A mold assembly as defined in claim 2 wherein the perforations in the inner wall comprise suction ports in the bottom corners of the mold box.

4. A mold assembly as defined in claim 3 further comprising a plurality of spacer members between the inner and outer walls.

5. A mold assembly as defined in claim 3 further comprising a plurality of fixed mold parts dimensioned to be fixedly insertable within the master mold in cooperation with the separable mold parts, the separable mold parts being undercut and removable from the master mold together with a formed panel.

6. A mold assembly as defined in claim 5 further comprising vacuum drawing means coupled to the undercut portions of the separable mold parts for drawing the panel therein during molding.

7. An adaptive deep drawing mold assembly for the vacuum shaping and forming a large volume, three dimensional, hollow thermoplastic unitary structures from large area, substantially planar, deformable thermoplastic panels, such structures including boundary panels and inwardly projecting, interior fixtures integral with the boundary panels, said assembly comprising:

a. an open topped, large volume, rigid box-shaped master mold having spaced inner and outer walls sealingly engaged with each other at the upper edge of the mold defining the open top, a plurality of spacer members being positioned between the inner and outer walls to provide the necessary rigidity, b. means for sealing a thermoplastic panel placed over the open top of the mold to the upper edge thereof, c. a plurality of suction ports in the bottom corners of the inner wall of the mold box to permit communication between the interior volume of the box-shaped master mold and the space between the inner and outer walls, d. a plurality of relatively small volume, separable mold parts dimensioned to be simultaneously, cooperably, and loosely inserted within the master mold in a plurality of predetermined, inwardly projecting, selective configurations to provide a mold assembly whose overall configuration is defined by the general box-shape of the master mold as modified by the inward projection formed by the separable mold parts, the inner wall of the master mold defining the boundary panels and the separable mold parts defining the interior fixtures, e. means coupled through the outer wall to the space between the inner and outer walls for evacuating air therefrom, f. heat producing means mounted between the inner and outer walls of the master mold, g. a plurality of fixed mold parts dimensioned to be fixedly insertable within the master mold in cooperation with the separable mold parts, the separable mold parts being undercut and removable from the master mold together with a formed panel, and h. vacuum drawing means coupled to the undercut portions of the separable mold parts for drawing the panel therein during molding, whereby a deformable thermoplastic panel placed over the open top of the mold and sealed to the upper edge thereof may be vacuum drawn down into the mold against the inner wall and the fixed and separable mold parts to form a structure conforming to said overall configuration.

* * * * *

UNITED STATES PATENT OFFICE
CERTIFICATE OF CORRECTION

Patent No. 3,811,810      Dated May 21, 1974

Inventor(s) Hans Gunter Moller

It is certified that error appears in the above-identified patent and that said Letters Patent are hereby corrected as shown below:

In The Heading:

The claimed Priority Data was omitted. Should read:

--December 13, 1969      Germany........ .......P 19 62 633.6--

Signed and sealed this 1st day of October 1974.

(SEAL)
Attest:

McCOY M. GIBSON JR.
Attesting Officer

C. MARSHALL DANN
Commissioner of Patents